United States Patent
Yaguchi

(10) Patent No.: US 7,822,535 B2
(45) Date of Patent: Oct. 26, 2010

(54) INTERNAL COMBUSTION ENGINE STOP CONTROLLER AND STOP CONTROL METHOD

(75) Inventor: Hideaki Yaguchi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 217 days.

(21) Appl. No.: 12/226,053

(22) PCT Filed: Apr. 20, 2007

(86) PCT No.: PCT/JP2007/059142

§ 371 (c)(1),
(2), (4) Date: Oct. 7, 2008

(87) PCT Pub. No.: WO2007/126037

PCT Pub. Date: Nov. 8, 2007

(65) Prior Publication Data

US 2009/0171554 A1 Jul. 2, 2009

(30) Foreign Application Priority Data

Apr. 24, 2006 (JP) ............................. 2006-119395

(51) Int. Cl.
*G06F 19/00* (2006.01)
*F02F 1/00* (2006.01)
(52) U.S. Cl. .................... 701/112; 123/319; 123/331; 123/339.14; 180/65.21
(58) Field of Classification Search ............... 701/101, 701/102, 112; 123/319, 320, 325, 331, 334, 123/335, 339.14; 180/65.21, 65.265, 65.28
See application file for complete search history.

(56) References Cited

U.S. PATENT DOCUMENTS

| 5,583,406 | A | 12/1996 | Mutoh et al. |
| 6,487,096 | B1* | 11/2002 | Gilbreth et al. ............... 363/35 |
| 7,204,222 | B2 | 4/2007 | Yamauchi et al. |
| 7,254,468 | B2* | 8/2007 | Pillar et al. .................... 701/22 |
| 2002/0198648 | A1* | 12/2002 | Gilbreth et al. ............. 701/100 |
| 2004/0231897 | A1 | 11/2004 | Kimura et al. |
| 2004/0245783 | A1* | 12/2004 | Gilbreth et al. ............... 290/52 |
| 2005/0113988 | A1* | 5/2005 | Nasr et al. .................... 701/22 |

(Continued)

FOREIGN PATENT DOCUMENTS

JP A-07-107613 4/1995

(Continued)

*Primary Examiner*—John T Kwon
(74) *Attorney, Agent, or Firm*—Oliff & Berridge, PLC

(57) ABSTRACT

When engine stop control is executed, an ECU estimates input power to a power storage device in accordance with an estimation of power generated by a generator and estimation of total power consumption of circuitry from the generator to the power storage device in the current state of operation. Further, the ECU compares the estimated input power with a tolerable input power to the storage device. When the generated power is excessive, the state of operation of the circuitry is changed such that the total power consumption by the circuitry increases, and then, torque output of the generator is permitted, to attain desired deceleration at the engine stop. Accordingly, in the engine stop control in which stopping force is generated by the power generating operation by the rotating electric machine, excessive charging caused by excessive power input to the power storage device can be prevented.

18 Claims, 8 Drawing Sheets

U.S. PATENT DOCUMENTS

| | | | |
|---|---|---|---|
| 2005/0114007 A1* | 5/2005 | Pillar et al. | ................ 701/82 |
| 2005/0178594 A1 | 8/2005 | Yamauchi et al. | |

FOREIGN PATENT DOCUMENTS

| | | |
|---|---|---|
| JP | A-07-143611 | 6/1995 |
| JP | A-10-283039 | 10/1998 |
| JP | A-10-306739 | 11/1998 |
| JP | A-2000-316205 | 11/2000 |
| JP | A-2001-275367 | 10/2001 |
| JP | A-2004-201439 | 7/2004 |
| JP | A-2005-2989 | 1/2005 |
| JP | A-2005-160154 | 6/2005 |
| JP | A-2005-231409 | 9/2005 |
| JP | A-2005-322454 | 11/2005 |
| JP | A-2006-9601 | 1/2006 |
| JP | A-2006-50773 | 2/2006 |
| JP | A-2006-52833 | 2/2006 |
| JP | A-2006-94616 | 4/2006 |

* cited by examiner

INTERNAL COMBUSTION ENGINE STOP CONTROLLER AND STOP CONTROL METHOD

TECHNICAL FIELD

The present invention relates to a stop controller and a stop control method for an internal combustion engine and, more specifically, to stop control of an internal combustion engine in a vehicle in which stopping force for the internal combustion engine can be generated by a power generating operation of a rotating electric machine.

BACKGROUND ART

A vehicle mounting a power train combining an internal combustion engine (by way of example, use of a known engine such as a gasoline engine or a diesel engine may be possible) and a rotating electric machine (motor generator or the like), referred to as a hybrid system, has been developed and put to practical use. In such a vehicle, output share of an operation by the internal combustion engine (hereinafter also referred to as an engine) and an operation by the rotating electric machine is automatically switched independent from an amount of accelerator operation by the driver, to be regulated to attain the highest efficiency. For example, when the engine is operated for rotating a generator operated in a steady state for charging a power storage device such as a secondary battery, or when the engine is operated intermittently during running in accordance with the amount of charge of the secondary battery, start and stop of the engine operation are repeated independent of the amount of accelerator operation by the driver. Specifically, by operating the engine and the electric motor separately or in a coordinated manner, mileage can be improved and emission of exhaust gas can significantly be reduced.

In this manner, the engine of a hybrid vehicle is intermittently driven during running and, therefore, stop control takes place frequently. In engine stop control, an approach may be taken in which rotational energy of the engine (kinetic energy) is applied to a generator and the energy is converted to electric energy by the generator for stopping the vehicle. The electric power generated at this time is used for charging the secondary battery.

Japanese Patent Laying-Open No. 10-306739 (hereinafter referred to as Patent Document 1) discloses a power output device including a prime mover (corresponding to an engine), a triaxial power input/output means and two electric motors, in which rotation speed of the prime mover is quickly set to zero when the operation of prime mover is stopped. The power output device is for outputting power to a driving shaft, and includes: a prime mover having an output shaft; a first electric motor having a rotation shaft and inputting/outputting power to/from the rotation shaft; a second electric motor inputting/outputting power to/from the driving shaft; triaxial power input/output means having three axes coupled to the driving shaft, the output shaft and the rotation shaft, respectively, and when power is input to/output from any two of the three axes, for inputting/outputting power determined by the input/output power to/from the remaining axis; fuel stop instructing means for instructing stop of fuel supply to the prime mover when conditions to stop operation of the prime motor are satisfied; and stop control executing means for adding torque to the output shaft and regulating deceleration of rotation of the output shaft to a prescribed range to stop the prime mover in accordance with the instruction to stop fuel supply to the prime mover.

In the power output device, when conditions to stop the operation of the prime mover are satisfied, the power output device instructs stop of fuel supply to the prime mover and executes stop control. In the stop control, torque in a direction opposite to the direction of rotation is applied to the output shaft of prime mover so that deceleration of the output shaft is limited in a prescribed range and the prime mover is stopped. As a result, deceleration of the output shaft is limited within a prescribed range and, by way of example, regulation to quickly pass through a torsional resonance range, becomes possible. At the same time, it becomes possible to avoid wasteful power consumption in the electric motor.

In the device described in Patent Document 1, by the engine stop control, the rotational energy of engine is converted to electric energy by the power generation operation of the rotating electric machine (first electric motor), and recovered. The electric energy is typically used for charging a battery.

However, if tolerable input power to the battery is limited, for example, if the state of charge (SOC) of the battery is almost full or if the battery is cold, the electric power generated during the engine stop control could be excessive, possibly resulting in excessive charging of the battery. If the engine stop control involving power generation operation by the rotating electric machine is executed in such a state, excessive charging may cause damage or decrease battery life.

DISCLOSURE OF THE INVENTION

An object of the present invention is to provide an internal combustion engine stop controller and a stop control method that can prevent excessive charging caused by excessive power input to the power storage device, when stop control is executed for an internal combustion engine that generates stopping force by the power generating operation of the rotating electric machine.

The present invention provides a stop controller for an internal combustion engine in a vehicle including the internal combustion engine operated on fuel combustion, a first rotating electric machine formed to generate force for stopping the internal combustion engine by a power generating operation when the internal combustion engine is stopped, and a power exchange circuit for exchanging power between a power storage device and the first rotating electric machine, including input limit setting means, power generation estimating means, input power estimating means, and loss control means. The input limit setting means sets tolerable input power of the power storage device. The power generation estimating means estimates power generated by the first rotating electric machine when the internal combustion engine is stopped. The input power estimating means estimates power consumption by the power exchange circuit when the internal combustion engine is stopped, and based on the estimated power consumption and the power generation estimated by the power generation estimating means, estimates the input power to the power storage device. The loss control means controls an operation of the power exchange circuit such that power consumption by the power exchange circuit increases, when the input power estimated by the input power estimating means exceeds the tolerable input power.

The present invention provides a stop control method for an internal combustion engine in a vehicle including the internal combustion engine operated on fuel combustion, a first rotating electric machine formed to generate force for stopping the internal combustion engine by a power generating operation when the internal combustion engine is stopped, and a power exchange circuit for exchanging power between a power storage device and the first rotating electric machine, including the steps of: setting tolerable input power of the power storage device; estimating power generated by the first rotating electric machine when the internal combustion engine is stopped; estimating power consumption by the power exchange circuit when the internal combustion engine is stopped, and based on the estimated power consumption and the estimated power generation, estimating input power to the power storage device; and controlling an operation of the power exchange circuit such that power consumption by the power exchange circuit increases, when the estimated input power exceeds the tolerable input power.

According to the stop controller and stop control method for the internal combustion engine described above, at the time of stop control of the internal combustion engine, input power to the power storage device is estimated and if the estimated input power exceeds the tolerable input power to the power storage device, the operation of power exchange circuit can be controlled such that the power consumption increases. Consequently, it becomes possible to accurately detect the possibility that the power input to the power storage device by the stop control of internal combustion engine be excessive, and to prevent excessive charging of the power storage device by increasing power consumption by the power exchange circuit. Specifically, based on the estimation of power generated by the stop control of internal combustion engine and power consumption by the power exchange circuit, the power consumption by the power exchange circuit is increased only when the power input to the power storage device would exceed the tolerable input power. Therefore, increase of power consumption by the power exchange circuit is minimized and more efficient recovery of electric energy becomes possible.

Preferably, the stop controller for an internal combustion engine further includes voltage determining means and power generation stopping means. The voltage determining means compares an output voltage of the power storage device with a management upper limit voltage. The power generation stopping means stops, when it is determined by the voltage determining means that the output voltage of the power storage device exceeds the management upper limit voltage, the power generation operation by the first rotating electric machine when the internal combustion engine is stopped. Alternatively, the stop control method for an internal combustion engine further includes the steps of: comparing an output voltage of the power storage device with a management upper limit voltage; and stopping, when it is determined at the comparing step that the output voltage of the power storage device exceeds the management upper limit voltage, the power generation operation by the first rotating electric machine when the internal combustion engine is stopped.

Because of such an arrangement, if the voltage of power storage device increases because of excessive charging, the stop control of internal combustion engine by the first rotating electric machine is stopped and hence, it becomes possible to reliably prevent excessive charging of the power storage device.

Preferably, the stop controller for an internal combustion engine further includes input power predicting means and power generation reducing means. The input power predicting means predicts input power to the power storage device when the power consumption by the power exchange circuit is increased to an upper limit by the loss control means. The power generation reducing means modifies, when the input power to the power storage device predicted by the input power predicting means exceeds the tolerable input power, an output torque command for the first rotating electric machine so that power generation by the first rotating electric machine is reduced. Alternatively, the stop control method for an internal combustion engine further includes the steps of: predicting input power to the power storage device when the power consumption by the power exchange circuit is increased to an upper limit at the controlling step; and modifying, when the input power to the power storage device predicted at the predicting step exceeds the tolerable input power, an output torque command for the first rotating electric machine so that power generation by the first rotating electric machine is reduced.

Because of such an arrangement, the stop control is realized in which deceleration of the internal combustion engine is increased within a limited range that can reliably avoid continuous excessive charging of the power storage device and can protect the device.

More preferably, the power exchange circuit includes a first inverter formed to perform power-conversion between DC power input to/output from the power storage device and AC power input to/output from the first rotating electric machine, by switching operations of a plurality of switching elements. The loss control means increases, when the input power estimated by the input power estimating means exceeds the tolerable input power, switching frequency of each of the switching elements of the first inverter. Alternatively, at the controlling step, when the estimated input power exceeds the tolerable input power, switching frequency of each of the switching elements of the first inverter is increased.

Because of such an arrangement, by increasing switching loss of the inverter (first inverter) converting power between the power storage device and the first rotating electric machine, it becomes possible to increase power consumption of the power exchange device and thereby to prevent excessive charging of the power storage device, without providing a new mechanism for consuming excessive power.

More preferably, the vehicle further includes a second rotating electric machine capable of generating vehicle driving force in parallel with the internal combustion engine, and the power exchange circuit includes a second inverter formed to perform power-conversion between DC power input to/output from the power storage device and AC power input to/output from the second rotating electric machine, by switching operations of a plurality of switching elements. The loss control means increases, when the input power estimated by the input power estimating means exceeds the tolerable input power, switching frequency of each of the switching elements of the second inverter. Alternatively, at the controlling step, when the estimated input power exceeds the tolerable input power, switching frequency of each of the switching elements of the second inverter is increased.

Because of such an arrangement, in a hybrid vehicle provided with the second rotating electric machine capable of generating the vehicle driving force in parallel with the internal combustion engine, by increasing the switching loss of the inverter (second inverter) for controlling driving of the second rotating electric machine, it becomes possible to increase power consumption of the power exchange device and thereby to prevent excessive charging of the power storage device, without providing a new mechanism for consuming excessive power.

Alternatively or more preferably, the power exchange circuit includes a converter and a first inverter. The converter is provided between the power storage device and a DC power line, for exchanging DC power between the power storage device and the DC power line by a switching operation of a switching element. The first inverter is formed to perform power-conversion between DC power on the DC power line and AC power input to/output from the first rotating electric machine, by switching operations of a plurality of switching elements. The switching operation in the converter is controlled such that voltage of the DC power line is regulated in accordance with a voltage command value. The loss control means increases, when the input power estimated by the input power estimating means exceeds the tolerable input power, switching frequency of the switching element of the converter. Alternatively, at the controlling step, when the estimated input power exceeds the tolerable input power, switching frequency of the switching element of the converter is increased.

Because of such an arrangement, by increasing the switching loss of the converter power-converting the input/output voltage of the power storage device, it becomes possible to increase power consumption of the power exchange device and thereby to prevent excessive charging of the power storage device, without providing a new mechanism for consuming excessive power.

Preferably, the power exchange circuit includes a converter and first and second inverters. The converter is provided between the power storage device and a DC power line, for exchanging DC power between the power storage device and the DC power line by a switching operation of a switching element. The first inverter is formed to perform power-conversion between DC power on the DC power line and AC power input to/output from the first rotating electric machine, by switching operations of a plurality of switching elements. The second inverter is formed to perform power-conversion between DC power on the DC power line and AC power input to/output from the second rotating electric machine, by switching operations of a plurality of switching elements. The switching operation in the converter is controlled such that voltage of the DC power line is regulated in accordance with a voltage command value. The loss control means increases the voltage command value of the converter when the input power estimated by the input power estimating means exceeds the tolerable input power. Alternatively, at the controlling step, the voltage command value of the converter is increased when the estimated input power exceeds the tolerable input power.

Because of such an arrangement, by increasing the voltage command value to the converter, the DC voltage switched by the first inverter is increased, whereby switching loss can be increased. Therefore, it becomes possible to increase power consumption of the power exchange device and thereby to prevent excessive charging of the power storage device, without providing a new mechanism for consuming excessive power. In the arrangement in which a smoothing capacitor is provided on the DC power line, excessive charging of the power storage device can more effectively be prevented, by reducing input power to the power storage device, by increasing the power to be stored in the capacitor.

Preferably, the vehicle further includes a second rotating electric machine capable of generating vehicle driving force in parallel with the internal combustion engine, and the power exchange circuit includes a converter and first and second inverters. The converter is provided between the power storage device and a DC power line, for exchanging DC power between the power storage device and the DC power line by a switching operation of a switching element. The first inverter is formed to perform power-conversion between DC power on the DC power line and AC power input to/output from the first rotating electric machine, by switching operations of a plurality of switching elements. The second inverter is formed to perform power-conversion between DC power on the DC power line and AC power input to/output from the second rotating electric machine, by switching operations of a plurality of switching elements. The switching operation in the converter is controlled such that voltage of the DC power line matches a voltage command value. The loss control means executes, when the input power estimated by the input power estimating means exceeds the tolerable input power, at least one of (1) increase of switching frequency of the switching element of the converter, (2) increase of switching frequency of each of the switching elements of the first inverter, (3) increase of switching frequency of each of the switching elements of the second inverter, and (4) increase of the voltage command value of the converter. Alternatively, at the controlling step, when the estimated input power exceeds the tolerable input power, at least one of (1) to (4) above is executed.

In such an arrangement, by increasing switching loss of at least one of the converter power-converting the input/output voltage of the power storage device and the first and second inverters for controlling driving of the first and second rotating electric machines, it becomes possible to increase power consumption of the power exchange device and thereby to prevent excessive charging of the power storage device, without providing a new mechanism for consuming excessive power.

Preferably, the power storage device is implemented by a lithium ion secondary battery.

Therefore, the main advantage of the present invention is that, at the time of stop control of an internal combustion engine in which the internal combustion engine stopping force is generated by the power generating operation of the rotating electric machine, excessive charging caused by excessive power input to the power storage device can be prevented.

BEST MODES FOR CARRYING OUT THE INVENTION

Figure 1:
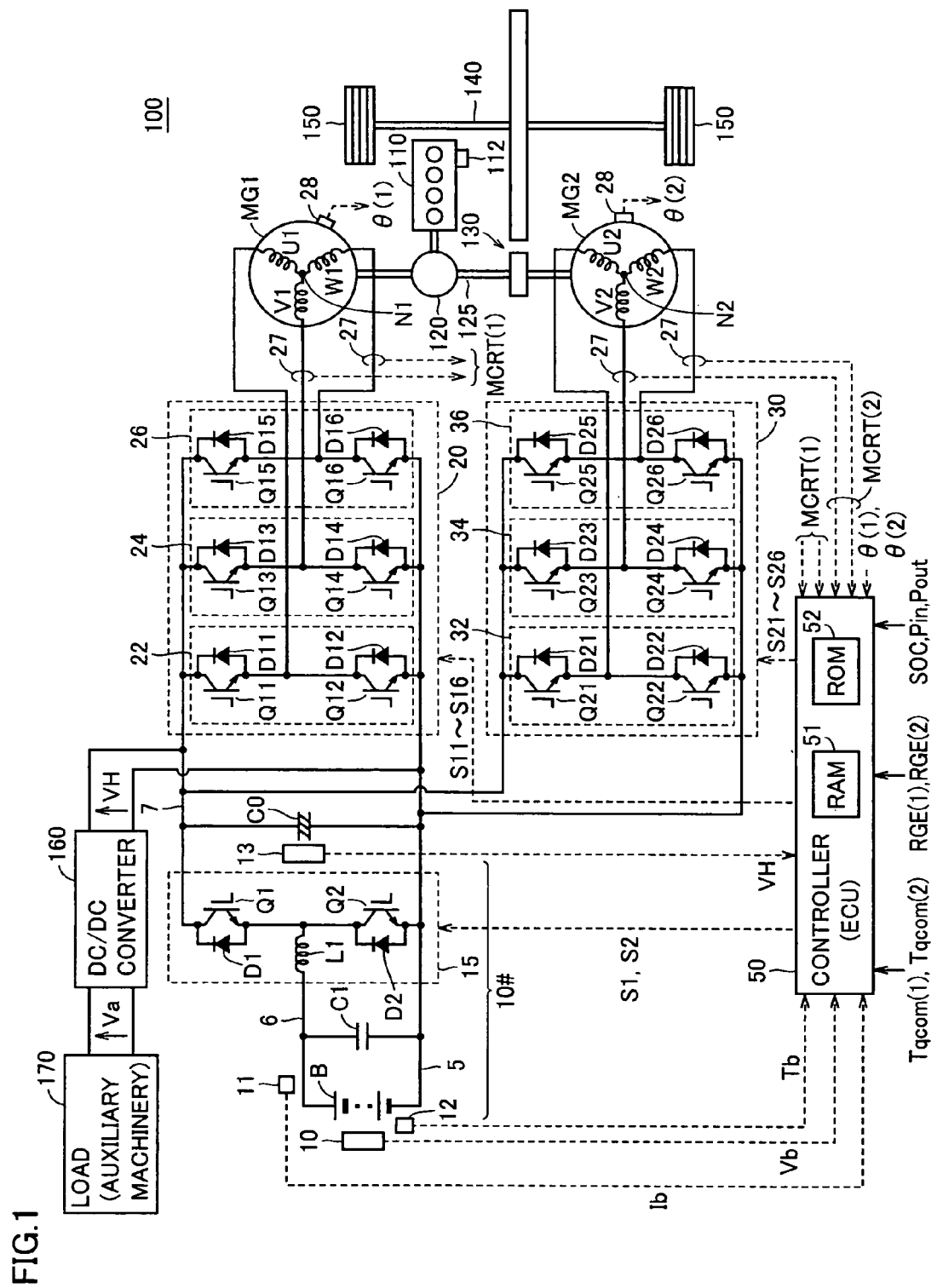
FIG. 1 is a block diagram showing a configuration of a hybrid vehicle shown as an example for mounting the internal combustion engine stop controller in accordance with an embodiment of the present invention.

In the following, an embodiment of the present invention will be described in detail with reference to the figures. In the figures, the same or corresponding portions are denoted by the same reference characters and, basically, description thereof will not be repeated.

FIG. 1 is a block diagram illustrating a configuration of a hybrid vehicle 100 shown as an example for mounting the internal combustion engine stop controller in accordance with an embodiment of the present invention.

Referring to FIG. 1, hybrid vehicle 100 includes an engine 110, a power split mechanism 120, motor generators MG1 and MG2, a reduction gear 130, a driving shaft 140 and wheels (driving wheels) 150. Hybrid vehicle 100 further includes a DC voltage generating unit 10#, a smoothing capacitor C0, inverters 20 and 30, and a controller 50, for controlling driving of motor generators MG1 and MG2.

Engine 110 is implemented, for example, by an internal combustion engine such as a gasoline engine or a diesel engine. A water temperature sensor 112 detecting temperature of cooling water is provided on engine 110. An output of water temperature sensor 112 is transmitted to controller 50.

Power split mechanism 120 is formed to allow distribution of power generated by engine 110 to a path to driving shaft 140 and to a path to motor generator MG1. A planetary gear mechanism having three rotation shafts of a sun gear, a planetary gear and a ring gear may be used as the power split mechanism 120. By way of example, it is possible to mechanically connect engine 110 and motor generators MG1 and MG2 to power split mechanism 120 by making the rotor of motor generator MG1 hollow and passing a crank shaft of engine 110 through the center thereof. Specifically, the rotor of motor generator MG1 is connected to the sun gear, the output shaft of engine 110 is connected to the planetary gear, and the output shaft 125 is connected to the ring gear. Output shaft 125, which is also connected to a rotation shaft of motor generator MG2, is connected to driving shaft 140 for driving rotation of driving wheels 150 through reduction gear 130. A reduction gear corresponding to the rotation shaft of motor generator MG2 may further be incorporated.

Motor generator MG1 is formed to have functions of a motor and a generator, to operate as a generator driven by engine 110 and as a motor that can start the operation of engine 110.

Similarly, motor generator MG2 is incorporated in hybrid vehicle 100 for generating power to drive the vehicle, of which output is transmitted through output shaft 125 and reduction gear 130 to driving shaft 140. Further, motor generator MG2 is formed to have the functions of a motor and a generator, to generate an output torque in the direction opposite to the rotation of wheels 150, thereby to regenerate electric power.

Next, a structure for controlling driving of motor generators MG1 and MG2 will be described.

DC voltage generating unit 10# includes a battery B for running, a smoothing capacitor C1, and a step-up/down converter 15. Battery B for running corresponds to the "power storage device" of the present invention, and step-up/down converter 15 corresponds to the "converter" of the present invention.

Nickel hydride or lithium ion secondary battery may be used as battery B for running. In the embodiment below, a structure in which battery B for running implemented by a secondary battery is used as the "power storage device" will be described. It is noted, however, that an electric double layer capacitor or the like may be used in place of battery B for running.

A battery voltage Vb output by battery B for running is detected by a voltage sensor 10, and a battery current Ib input to/output from battery B for running is detected by a current sensor 11. A temperature sensor 12 is provided on battery B for running. Temperature of battery B for running, however, may vary locally. Therefore, temperature sensors 12 may be provided on a plurality of portions of battery B for running. Battery voltage Vb, battery current Ib and battery temperature Tb detected by voltage sensor 10, current sensor 11 and temperature sensor 12 are output to controller 50.

Smoothing capacitor C1 is connected between a ground line 5 and a power supply line 6. Between a positive electrode terminal of battery B for running and power supply line 6 and between a negative electrode terminal of battery B for running and ground line 5, relays (not shown) are provided, which are turned on when the vehicle is in operation and turned off when the operation of the vehicle stops.

Step-up/down converter 15 (hereinafter also simply referred to as a converter) includes a reactor L1 and power semiconductor switching elements Q1 and Q2 (hereinafter referred to as "switching elements"), of which switching is controlled. Reactor L1 is connected between a connection node of switching elements Q1 and Q2 and power supply line 6. Smoothing capacitor C0 is connected between power supply line 7 and ground line 5.

Power semiconductor switching elements Q1 and Q2 are connected in series between power supply line 7 and ground line 5. On/off of power semiconductor switching elements Q1 and Q2 is controlled by switching control signals S1 and S2 from controller 50.

In the embodiment of the present invention, as the switching element, an IGBT (Insulated Gate Bipolar Transistor), a power MOS (Metal Oxide Semiconductor) transistor, or a power bipolar transistor may be used. Anti-parallel diodes D1 and D2 are arranged for switching elements Q1 and Q2.

As will be described in the following, by the arrangement of step-up/down converter 15, the DC voltage on power line 7 can be variably controlled, not fixed on the output voltage of power storage device (battery B for running). As a result, amplitude of AC voltage applied to motor generators MG1 and MG2 can be variably controlled, whereby highly efficient motor control is realized.

DC voltage sides of inverters 20 and 30 are connected to step-up/down converter 15 through common ground line 5 and power supply line 7. Specifically, power supply line 7 corresponds to the "DC power line" of the present invention. Further, motor generator MG1 corresponds to the "first electric motor" of the present invention, and motor generator MG2 corresponds to the "second electric motor" of the present invention. Specifically, inverter 20 corresponds to the "first inverter" of the present invention, and inverter 30 corresponds to the "second inverter" of the present invention. Further, step-up/down converter 15, smoothing capacitor C0 and inverters 20 and 30 constitute the "power exchange circuit" of the present invention.

Inverter 20 is formed of a U-phase arm 22, a V-phase arm 24 and a W-phase arm 26 provided in parallel between power supply line 7 and ground line 5. The arm of each phase is implemented by switching elements connected in series between power supply line 7 and ground line 5. For example, U-phase arm 22 includes switching elements Q11 and Q12, V-phase arm 24 includes switching elements Q13 and Q14, and W-phase arm 26 includes switching elements Q15 and Q16. Further, anti-parallel diodes D11 to D16 are connected to switching elements Q11 to Q16, respectively. On/off of switching elements Q11 to Q16 is controlled by switching control signals S11 to S16 from controller 50, respectively.

Motor generator MG1 includes a U-phase coil U1, a V-phase coil V1 and a W-phase coil W1, provided on a stator, and a rotor, not shown. U-phase coil U1, V-phase coil V1 and W-phase coil W1 have one end connected together at a neutral point N1, and have the other end connected to U-phase arm 22, V-phase arm 24 and W-phase arm 26 of inverter 20, respectively. Inverter 20 performs bi-directional power conversion between DC voltage generating unit 10# and motor generator MG1, through on/off control (switching control) of switching elements Q11 to Q16 in response to switching control signals S11 to S16 from controller 50.

Specifically, in accordance with switching control by controller 50, inverter 20 may convert the DC voltage received from power supply line 7 to a 3-phase AC voltage, and output the converted 3-phase AC voltage to motor generator MG1. Consequently, motor generator MG1 is driven to generate a designated torque. Further, in accordance with the switching control by controller 50, inverter 20 may convert the 3-phase AC voltage generated by motor generator MG1 receiving an output of engine 110 to a DC voltage and output the converted DC voltage to power supply line 7.

Inverter 30 has a structure similar to inverter 20, and includes switching elements Q21 to Q26, of which on/off is controlled by switching control signals S21 to S26, and anti-parallel diodes D21 to D26.

Motor generator MG2 has a structure similar to motor generator MG1, and includes a U-phase coil U2, a V-phase coil V2 and a W-phase coil W2 provided on a stator, and a rotor, not shown. Similar to motor generator MG1, U-phase coil U2, V-phase coil V2 and W-phase coil W2 have one end connected together at a neutral point N2, and have the other end connected to U-phase arm 32, V-phase arm 34 and W-phase arm 36 of inverter 30, respectively.

Inverter 30 performs bi-directional power conversion between DC voltage generating unit 10# and motor generator MG2, through on/off control (switching control) of switching elements Q21 to Q26 in response to switching control signals S21 to S26 from controller 50.

Specifically, in accordance with switching control by controller 50, inverter 30 may convert the DC voltage received from power supply line 7 to a 3-phase AC voltage, and output the converted 3-phase AC voltage to motor generator MG2. Consequently, motor generator MG2 is driven to generate a designated torque. Further, in accordance with the switching control by controller 50, inverter 30 may convert the 3-phase AC voltage generated by motor generator MG2 receiving rotational force of wheel 150 at the time of regenerative braking of the vehicle to a DC voltage and output the converted DC voltage to power supply line 7.

The regenerative braking here refers to braking with regeneration through a foot brake operation by a driver of the hybrid vehicle, or deceleration (or stopping acceleration) of the vehicle while regenerating power, by releasing the accelerator pedal during running, without operating the foot brake.

Each of motor generators MG1 and MG2 is provided with a current sensor 27 and a rotation angle sensor (resolver) 28. As the sum of instantaneous values of 3-phase currents iu, iv and iw is zero, what is necessary is simply to arrange the current sensors 27 to detect motor currents of two phases only (for example, V-phase current iv and W-phase current iw), as shown in FIG. 1. Rotation angle sensor 28 detects a rotation angle θ of the rotor, not shown, of motor generators MG1 and MG2, and transmits the detected rotation angle θ to controller 50. Based on the rotation angle θ, the number of rotations Nmt (angular velocity ω) of motor generators MG1 and MG2 may be calculated by controller 50. In the present embodiment, the term "number of rotations" refers to the number of rotations per unit time (typically, per one minute), or rotation speed, unless specified otherwise.

Motor current MCRT(1) and rotor rotation angle θ(1) of motor generator MG1 as well as motor current MCRT(2) and rotor rotation angle θ(2) of motor generator MG2 detected by these sensors are input to controller 50. Further, controller 50 receives, as inputs, a torque command value Tqcom(1) and a control signal RGE(1) representing a regenerative operation of motor generator MG1 as well as a torque command value Tqcom(2) and a control signal RGE(2) representing a regenerative operation of motor generator MG2, as motor commands.

Controller 50 implemented by an electronic control unit (ECU) includes a microcomputer (not shown), an RAM (Random Access Memory) 51 and an ROM (Read Only Memory) 52, and generates, in accordance with a prescribed program processing, switching control signals S1 and S2 (step-up/down converter 15), S11 to S16 (inverter 20) and S21 to S26 (inverter 30) for switching control of step-up/down converter 15 and inverters 20 and 30, such that motor generators MG1 and MG2 operate in accordance with a motor command input from the electronic control unit (ECU) of a higher order.

Further, information related to battery B for running, such as SOC (state of charge) and allowable input power Pin and Pout representing charge/discharge limitation, is input to controller 50. Specifically, controller 50 has a function of limiting, as needed, the power consumption and the power generation (regenerative power) of motor generators MG1 and MG2, so that excessive charge or excessive discharge of battery B for running can be avoided.

Though a mechanism of switching the switching frequency through inverter control by a single controller (ECU) 50 has been described in the present embodiment, a similar control structure may be implemented by a cooperation of a plurality of controllers (ECUs).

Next, operations of step-up/down converter 15 and inverters 20 and 30 for controlling driving of motor generators MG1 and MG2 will be described.

In a voltage boosting operation of step-up/down converter 15, controller 50 sets a voltage command value VHref (hereinafter also referred to as "system voltage command value VHref") of a DC voltage VH (the DC voltage corresponding to the DC side voltage of inverters 20 and 30, hereinafter also referred to as "system voltage VH") based on the state of operations of motor generators MG1 and MG2, and based on the system voltage command value VHref and the detected value of a voltage sensor 13, generates switching control signals S1 and S2 such that the output voltage of step-up/down converter 15 becomes equal to the system voltage command value VHref.

At the time of a step-up operation, step-up/down converter 15 commonly supplies the system voltage VH obtained by boosting the DC voltage (battery voltage) Vb supplied from battery B for running to inverters 20 and 30. More specifically, in response to switching control signals S1 and S2 from controller 50, duty ratio (ratio of on period) of switching elements Q1 and Q2 is set, and the voltage-up ratio is in correspondence with the duty ratio.

At the time of a step-down operation, step-up/down converter 15 lowers the DC voltage (system voltage) supplied from inverters 20, 30 through smoothing capacitor C0 and charges battery B for running. Specifically, in response to switching control signals S1 and S2 from controller 50, a period in which only the switching element Q1 is on and a period in which both switching elements Q1 and Q2 are off are provided alternately, and the voltage-down ratio is in correspondence with the duty ratio of the on-period mentioned above.

Smoothing capacitor C0 smoothes the DC voltage (system voltage) from step-up/down converter 15, and supplies the smoothed DC voltage to inverters 20 and 30. Voltage sensor 13 detects the voltage at opposite ends of smoothing capacitor C0, that is, the system voltage VH, and outputs the detected value to controller 50.

Power is also supplied from power line 7 to other load 170 such as auxiliary machinery. By way of example, by providing a DC/DC converter 160 for voltage-converting the system voltage VH to an auxiliary machinery operating voltage Va between the load 170 and ground and power lines 5 and 7, electric power on power line 7 can be consumed by load 170. Load 170 may include, for example, a water heater, temperature adjusting device (air conditioner), a blower motor, a defroster heater and the like. Dependent on the state, of operations (on/off setting, operating conditions) of the load, the power consumed by load 170 changes.

Inverter 30 drives motor generator MG2 such that a torque in accordance with the torque command value Tqcom(2) is output, through on/off operations (switching operations) of switching elements Q21 to Q26 in response to switching control signals S21 to S26 from controller 50. The torque command value Tqcom(2) is set to a positive value (Tqcom(2)>0), zero (Tqcom(2)=0) or a negative value (Tqcom(2)<0) appropriately in accordance with a request of output (toque×number of rotations) to motor generator MG2, in accordance with the state of operation.

Particularly at the time of regenerative braking of a hybrid vehicle, the torque command value of motor generator MG2 is set to a negative value (Tqcom(2)<0). In this case, inverter 30 converts the AC voltage generated by motor generator MG2 to a DC voltage by a switching operation in response to switching control signals S21 to S26, and supplies the converted DC voltage (system voltage) through smoothing capacitor C0 to step-up/down converter 15.

Further, similar to the operation of inverter 30, inverter 20 converts power so that motor generator MG1 operates in accordance with the command value, by on/off control of switching elements Q11 to Q16 in accordance with switching control signals S11 to S16 from controller 50.

By the driving control of motor generators MG1 and MG2 in accordance with torque command values Tqcom(1) and Tqcom(2) by controller 50, in hybrid vehicle 100, generation of power for driving the vehicle through power consumption by motor generator MG2, generation of power for charging battery B for running or power to be consumed by motor generator MG2 through power generation by motor generator MG1, and generation of power for charging battery B for running through regenerative braking operation (power generation) by motor generator MG2 may be executed appropriately in accordance with the state of operation of the vehicle.

Specifically, in hybrid vehicle 100, operation and stopping of engine 110 are controlled in a manner not directly related to the amount of accelerator operation by the driver. Specifically, engine 110 may be operated intermittently in accordance with the state of running of the vehicle (load, vehicle speed etc.) and the state of charge of the power storage device (battery B for running). Consequently, by operating engine 110 and the electric motor (motor generator MG2) independently or in a coordinated manner as vehicle driving sources, it is possible to improve fuel consumption or to significantly reduce exhaust gas.

As described above, engine 110 is intermittently driven even during running and, therefore, stop control frequently takes place. In the following, engine stop control in hybrid vehicle 100 will be described.

Figure 2:
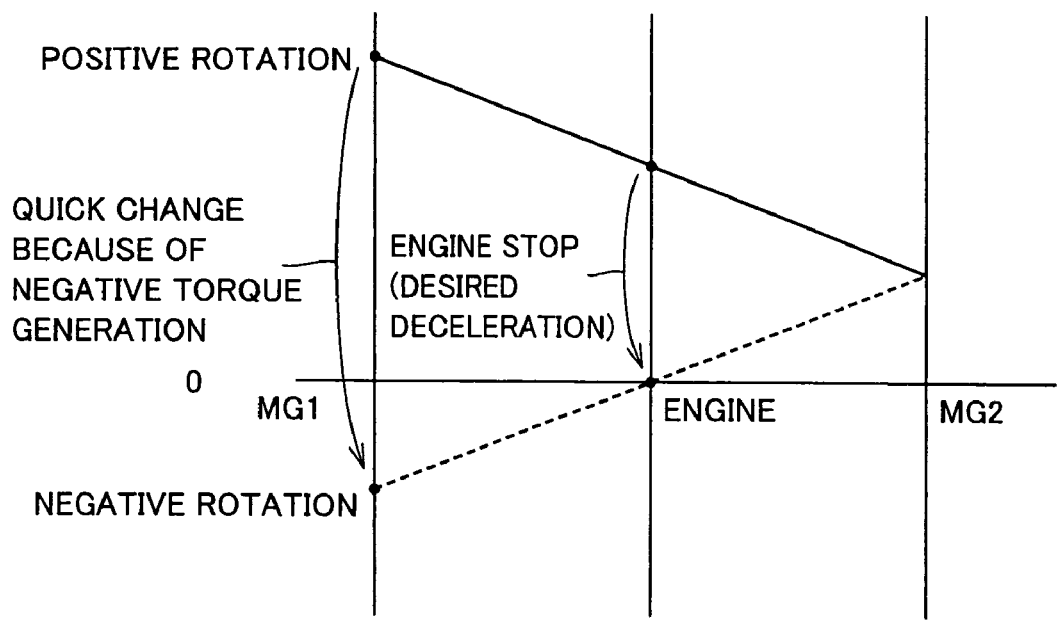
FIG. 2 is a nomogram representing device operation during engine stop control in the hybrid vehicle shown in FIG. 1.

As shown in FIG. 2, in hybrid vehicle 100, when engine 110 is stopped, fuel injection in engine 110 is stopped and, as in Patent Document 1 (Japanese Patent Laying-Open No. 10-306739), engine stop control is executed in which motor generator MG1 applies torque in a direction opposite to the rotating direction (positive rotation) of engine 110. Consequently, when the engine is stopped, the engine speed can quickly be lowered so that it can quickly pass through the resonance range and, hence, generation of torsional resonance can be prevented. Here, torque command value Tqcom(1) of motor generator MG1 is set to a prescribed value (negative value) at which a desired deceleration, calculated in advance through experiment, is attained. The torque command value here may be set as a fixed value, or it may be variably set in accordance with the engine speed at that time.

In the engine stop control as such, because of negative torque generation by motor generator MG1, electric power is generated that corresponds to torque×number of rotations. The generated electric power is converted to DC power by inverter 20 and supplied to power line 7. In the present embodiment, hereinafter the consumed power will be represented by a positive value and the generated power will be represented by a negative value.

Figure 3:
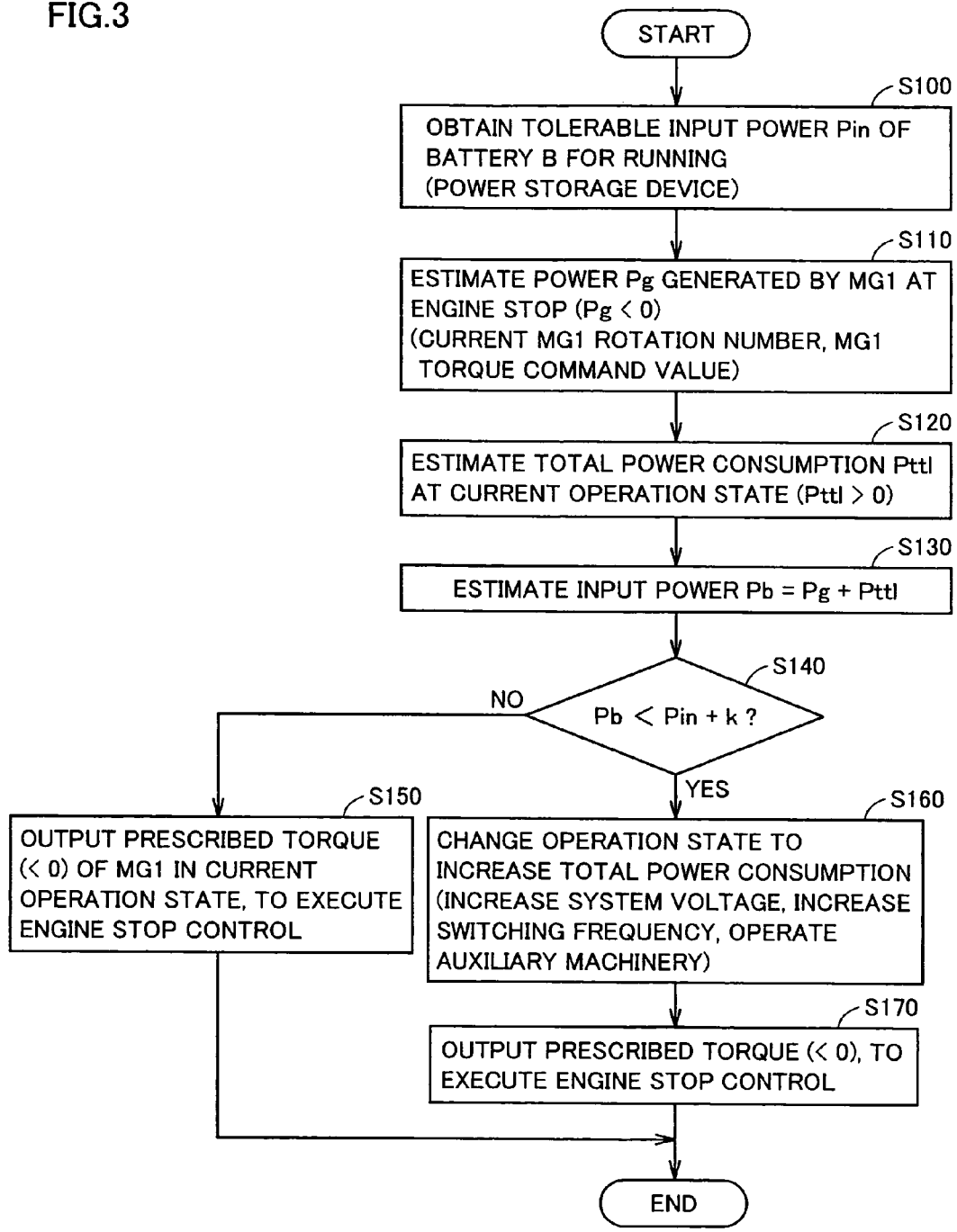
FIG. 3 is a flowchart representing a series of control processes in the engine stop control in accordance with the embodiment of the present invention.

FIG. 3 is a flowchart representing a series of control processes of the engine stop control in accordance with the embodiment of the present invention. The control process shown in FIG. 3 is realized by controller (ECU) 50 executing a prescribed program stored in advance in a prescribed period at the time of engine stop processing.

Referring to FIG. 3, at step S100, controller 50 obtains the tolerable input power Pin of battery B for running (power storage device). The tolerable input power Pin changes dependent on the battery state (SOC and/or battery temperature and the like). Particularly, when the battery is at a low temperature, the tolerable input power Pin decreases because of increased internal resistance and the like.

The tolerable input power Pin may be input from a separately provided controller (ECU) for battery control, or a map having battery temperature Tb, SOC and the like as arguments may be stored in controller 50 and the tolerable input power Pin may be found by making a reference to the map.

Thereafter, controller 50 estimates, at step S110, generated power Pg generated by motor generator MG1 in the engine stop control. Using current number of rotations Nmt1 of motor generator MG1 and torque command value Tqcom(1) of MG1, for example, the generated power Pg is given by Equation (1) below:

$$Pg = Nmt1 \cdot Tqcom(1) \qquad (1)$$

In Equation (1), as the torque command value Tqcom(1)<0 during engine stop control, the generated power Pg has a negative value (Pg<0).

Further, at step S120, controller 50 estimates total power consumption Ptt1 (Ptt1>0) in the current state of operation. Here, the total power consumption means the power consumption in a path through which the power generated by motor generator MG1 is input to the power storage device (battery B for running).

Figure 4:
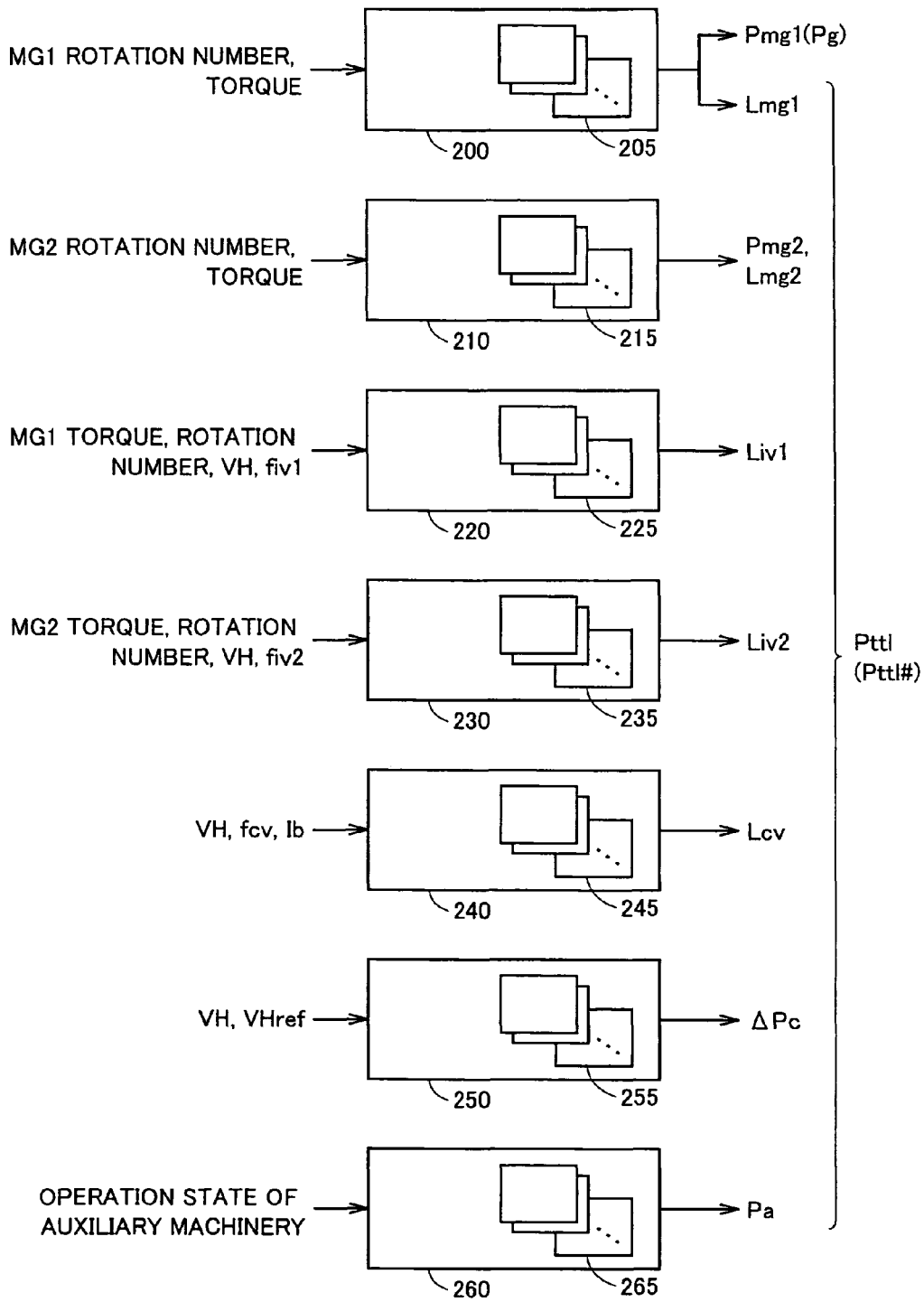
FIG. 4 is a functional block diagram illustrating power estimation in the engine stop control in accordance with the embodiment of the present invention.

By way of example, as shown in FIG. 4, total power consumption Ptt1 is calculated as a sum of power loss Lmg1 in motor generator MG1, effective power Pmg2 and power loss Lmg2 of motor generator MG2, power losses Liv1 and Liv2 of inverters 20 and 30, power loss Lcv of step-up/down converter 15, change ΔPc in stored power of smoothing converter C0, and auxiliary machinery power consumption Pa by load 170.

FIG. 4 is a functional block diagram illustrating power estimation in engine stop control in accordance with the embodiment of the present invention.

Referring to FIG. 4, an MG1 power consumption estimating unit 200 refers to an estimation map 205 and estimates the effective power Pmg1 of motor generator MG1 (which corresponds to the generated power Pg while the engine stop control is being executed) and power loss Lmg1 of motor generator MG1. Specifically, estimation of generated power Pg at step S110 of FIG. 3 is executed by MG1 power consumption estimating unit 200. Similarly, an MG2 power consumption estimating unit 210 refers to an estimation map 215 and estimates effective power Pmg2 of motor generator MG2 and power loss Lmg2 of motor generator MG2.

The effective power of motor generator is given as a product of the number of rotations of motor generator and the output torque. As described above, the effective power has a negative value when power is generated. The power loss in each motor generator is the sum of copper loss generated by the current flowing through coil windings of respective phases, and iron loss generated by flux variation at the iron core. Therefore, the smaller the current flowing through the coil windings of respective phases, the smaller becomes the power loss. Basically, the current value flowing through the coil windings corresponds to the output torque.

Therefore, map 205 is formed beforehand using the number of rotations and the torque (torque command value Tqcom(1)) of motor generator MG1 as arguments, to find estimated values of effective power Pmg1 and power loss Lmg1. Similarly, map 215 is formed beforehand using the number of rotations and the torque (torque command value Tqcom(2)) of motor generator MG2 as arguments, to find estimated values of effective power Pmg2 and power loss Lmg2.

Power consumption of respective inverters 20 and 30 mainly comes from power loss at switching elements Q11 to Q16 and Q21 to Q26. The power loss at the switching element mainly includes loss caused by on-resistance and loss caused by switching operations.

Here, power loss experienced in each of the switching elements of inverters 20 and 30 will be described with reference to FIG. 5.

Figure 5:
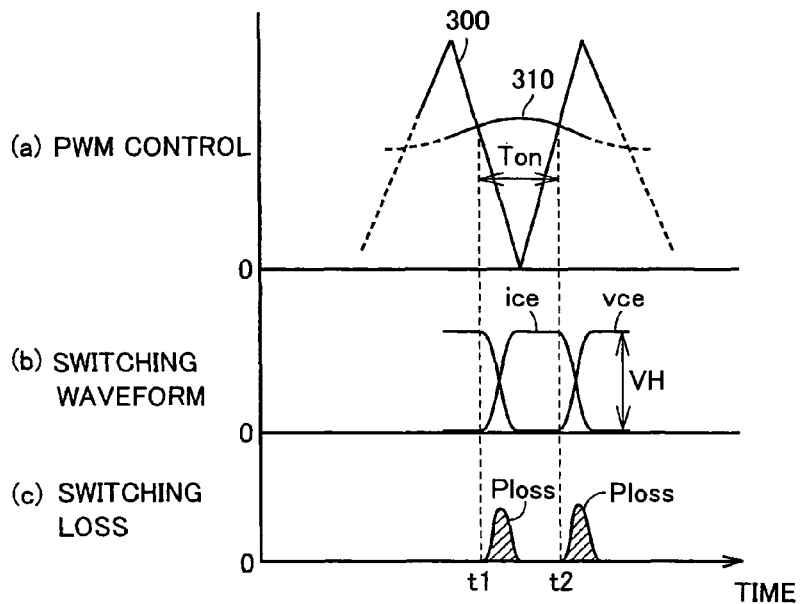
FIG. 5 is a diagram of waveforms illustrating power loss experienced by each switching element of the inverter.

Referring to FIG. 5, the switching operation of each switching element of inverters 20 and 30 is basically set in accordance with pulse width modulation control (PWM control). Specifically, in PWM control, based on a voltage comparison between a prescribed carrier wave 300 and a voltage command wave 310, on/off of the switching element of the arms of respective phases of inverters 20 and 30 is controlled, as shown in FIG. 5(a). Here, generally the carrier wave 300 is provided as a triangular wave or saw-tooth wave of a prescribed frequency, and the voltage command wave 310 represents the voltage (AC voltage) applied to the motor generator for generating the current of each phase necessary to operate motor generator MG in accordance with the torque command value Tqcom. On/off of the switching element forming one same arm is switched dependent on whether the carrier wave has higher voltage than the voltage command value or not. FIG. 5 shows, as an example, a switching waveform of a switching element that is turned on when the voltage command wave has higher voltage than the carrier wave and turned off when not.

As can be seen from FIG. 5(b), when the switching element is on, collector-emitter voltage vce attains to vce=0, while collector-emitter current ice is generated. On the contrary, when the switching element is off, collector-emitter current ice attains to ice=0 and collector-emitter voltage vce attains to vce=VH. Here, when the switching element is turned on or off, in a period before it is fully turned on or off, that is, until the collector-emitter voltage changes to vce=0 or the collector-emitter current changes to ice=0, there is generated a switching loss Ploss (Ploss=vce·ice) that corresponds to the product of collector-emitter voltage vce and collector-emitter current ice, as shown in FIG. 5(c). Because of the switching loss Ploss, heat builds up in the switching element and the temperature of the element increases.

Here, the amplitude of collector-emitter voltage vce corresponds to the system voltage VH, and the collector-emitter current ice corresponds to the current supplied to motor generator MG. Therefore, when the same torque is output, that is, when the torque command value is the same, switching loss Ploss becomes larger as the system voltage VH becomes higher. Further, the power loss associated with the switching operation becomes larger as the number of switching operations per unit time increases, that is, as the frequency of carrier wave 300 is set higher and the switching frequency becomes higher. Therefore, the power loss associated with the switching operation has a value dependent on the torque or output of motor generator, as well as on the DC voltage (system voltage VH) of switching and the switching frequency determined by the carrier frequency.

It is noted that even when the switching element is on, there is generated a power loss that corresponds to the product of on-resistance of the switching element and a square of current ice, though it is smaller than the switching loss Ploss. The power loss associated with the on-resistance can be estimated from the torque command value that determines the current to be supplied to motor generator MG.

Again referring to FIG. 4, inverter power consumption estimating unit 220 can estimate the power loss Liv1 of inverter 20 from the output (number of rotations×torque) or torque (torque command value Tqcom(1)) of motor generator MG1, system voltage VH and the carrier frequency fiv1 used in inverter 20, by making a reference to map 225. Map 225 is formed beforehand, to find the estimated value of power loss Liv1, using number of rotations and torque (torque command value Tqcom(1)) of motor generator MG1, system voltage VH and carrier frequency fiv1 as arguments.

Similarly, inverter power consumption estimating unit 230 can estimate the power loss Liv2 of inverter 30 from the output (number of rotations×torque) or torque (torque command value Tqcom(2)) of motor generator MG2, system voltage VH and the carrier frequency fiv2 used in inverter 30, by making a reference to map 235. Map 235 is formed beforehand, to find the estimated value of power loss Liv2, using number of rotations and torque (torque command value Tqcom(2)) of motor generator MG2, system voltage VH and carrier frequency fiv2 as arguments.

Next, power consumption of step-up/down converter 15 is mainly the sum of power loss at switching elements Q1 and Q2 and power loss at reactor L1. The power loss becomes smaller as the current passing through the converter (that is, battery current Ib) becomes smaller and the system voltage VH becomes lower. Further, the power loss at switching elements Q1 and Q2 becomes larger in proportion to the increase in the number of switching operations per unit time, that is, the carrier frequency fcv.

Therefore, converter power consumption estimating unit 240 can estimate the power loss Lcv of step-up/down converter 15 from system voltage VH, battery current Ib and the carrier frequency fcv used in step-up/down converter 15, by making a reference to map 245. Map 245 is formed beforehand, to find estimated value of power loss Lcv, using system voltage VH, battery current Ib and carrier frequency fcv as arguments.

In smoothing capacitor C0, voltage difference ΔVH between the current system voltage VH and the voltage command value VHref has an influence on the power input to the power storage device (battery B for running). Specifically, when VHref>VH, of the power generated by motor generator MG1, power corresponding to the voltage difference is stored in smoothing capacitor C0. If VH>VHref, the power corresponding to the voltage difference is discharged from the smoothing capacitor C0 and added to the power to be input to the power storage device.

Therefore, capacitor power estimating unit 250 can estimate the change ΔPc of stored power in smoothing capacitor C0, from the system voltage VH and voltage command value VHref, by making a reference to map 255. Map 255 is formed beforehand to find the change ΔPc of stored power, using system voltage VH and voltage command value VHref as arguments. Here, the change ΔPc of stored power is given by ΔPc=C0·ΔVH²/2 (where ΔVH=Vhref−VH).

Further, auxiliary machinery power consumption estimating unit 260 can estimate power consumption Pa by auxiliary machinery, from the state of operation (on/off setting, operating conditions etc.) of load (auxiliary machinery) 170, by making a reference to a map 265. Map 265 is formed beforehand to find the estimated value of power consumption Pa by auxiliary machinery, using the state of operation of the auxiliary machinery load (such as water heater, temperature adjusting device (air conditioner), blower motor, defroster heater and the like) as arguments.

Again referring to FIG. 3, at step S130, controller 50 estimates the power input to battery B for running (power storage device), as the sum of generated power Pg estimated at step S110 and total power consumption Ptt1 estimated at step S120. Specifically, the estimated input power Pb is given by Equation (2) below.

$$Pb=Pg+Ptt1 \quad (2)$$

Thereafter, at step S140, controller 50 determines which of estimated input power Pb calculated at step S130 and tolerable input power Pin is larger. As the tolerable input power Pin has a negative value, |Pb|>|Pin| holds when Pb<Pin, and the power input to the power storage device exceeds the tolerable value and is excessive. It is noted that, at step S140, a margin power k (k>0) may be set and whether the input power is excessive or not is determined dependent on whether Pb<Pin+k is satisfied or not, in order to more stably avoid excessive charging of the power storage device.

If the determination is NO at step S140, that is, if the estimated input power Pb reflecting the total power consumption Ptt1 in the current state of operation is not out of the tolerable range, controller 50 executes engine control to attain desired deceleration, by causing motor generator MG1 to generate a prescribed negative torque while the current state of operation is maintained (step S150).

If the determination is YES at step S140, that is, if the estimated input power Pb reflecting the total power consumption Ptt1 in the current state of operation is out of the tolerable range, controller 50 changes the state of operation of at least one of step-up/down converter 15 and inverters 20 and 30, so that the total power consumption Ptt1 increases, at step S160. Further, the state of operation of load 170 (auxiliary machinery) may also be changed.

Figure 6:
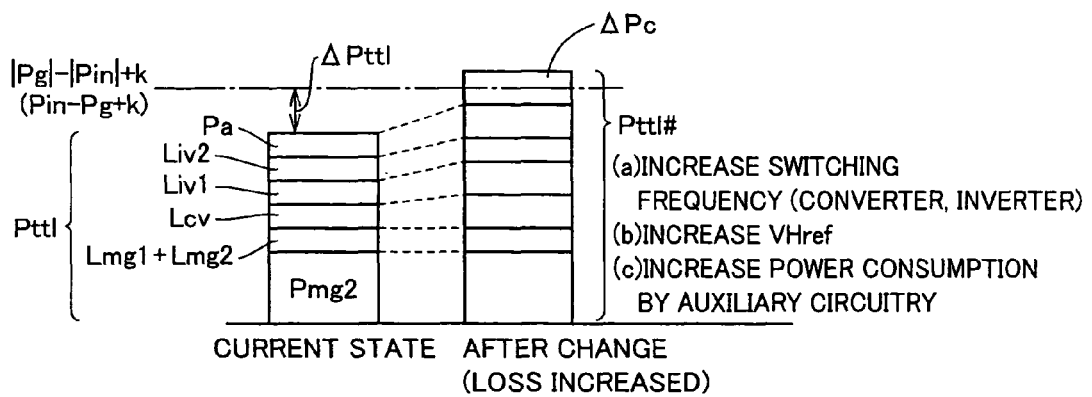
FIG. 6 is a first illustration showing the concept of avoiding excessive charge by increasing power consumption.

As shown in FIG. 6, to change the state of operation, at least one of (a) increase of switching frequency (increase in carrier frequency) of at least one of step-up/down converter 15 and inverters 20 and 30, (b) increase of voltage command value VHref, and (c) change of the state of operation of auxiliary machinery load, is executed. As a result, at least one of power loss Lcv at step-up/down converter 15, power loss Liv1 at inverter 20, Liv2 at inverter 30, power consumption Pa by load (auxiliary machinery) 170 and change ΔPc of stored power in smoothing capacitor C0 is increased and hence, the total power consumption Ptt1 is increased to Ptt1#. As to the increase of switching frequency (a) described above, it is not always necessary to execute increase for all of the step-up/down converter 15 and inverters 20 and 30, and whether increase is necessary or not may be determined one by one.

Here, the object of changing the state of operation at the process step S160 of FIG. 3 is determined in accordance with the necessary amount of increase ΔPtt1 (FIG. 6) of total power consumption Ptt1. By way of example, by calculating in advance the expected amount of increase in total power consumption resulting from execution of approaches (a) to (c) above, it becomes possible to determine in advance the relation between the necessary amount of increase ΔPtt1 and the object of changing the state of operation.

Again referring to FIG. 3, after the state of operation is changed so that the total power consumption is increased at step S160, at step S170, controller 50 executes the engine stop control to attain desired deceleration by causing motor generator MG1 to output a prescribed negative torque.

In the flowchart of FIG. 3, step S100 corresponds to the "input limit obtaining means" of the present invention, step S110 corresponds to the "power generation estimating means" of the present invention, and steps S120 and S130 correspond to the "input power estimating means" of the present invention. Further, step S160 corresponds to the "loss control means" of the present invention.

By the control structure as such, if it is expected that the power to be input to battery B for running (power storage device) will exceed the tolerable range during engine stop control for attaining desired deceleration, the power consumption by the "power exchange circuit" formed by step-up/down converter 15, smoothing capacitor C0 and inverters 20 and 30 is increased, whereby excessive charging of the power storage device can be prevented.

Particularly, based on the estimation of power consumption by the power consuming circuit in the current state of operation, the power consumption by the power exchange circuit is increased only when the power input to the power storage device would exceed the tolerable range. Therefore, wasteful increase in power consumption can be avoided, and electric energy generated by the engine stop control can effectively be recovered.

Further, as the power consumption is increased by changing the state of operation of step-up/down converter 15 and inverters 20 and 30, excessive charging of the power storage device can be prevented without providing any new mechanism for consuming excessive power.

(Modification 1)

Figure 7:
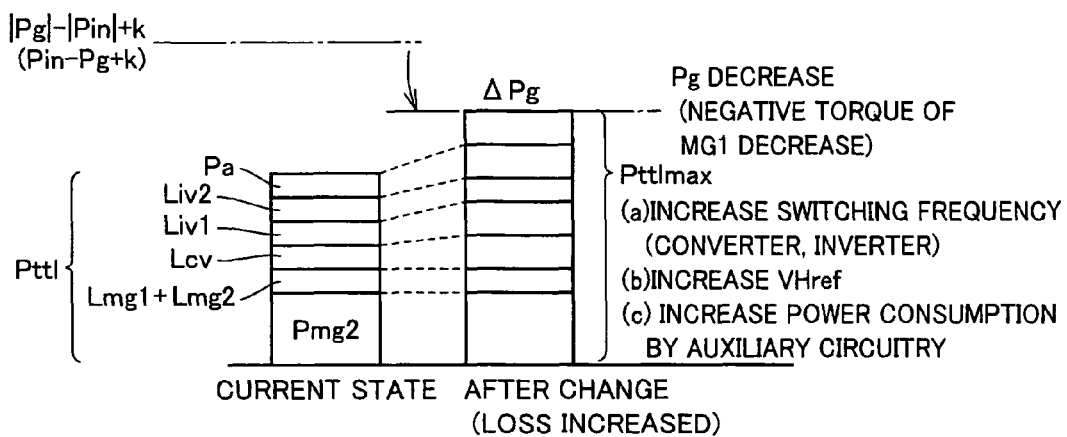
FIG. 7 is a second illustration showing the concept of avoiding excessive charge by increasing power consumption.

There is an upper limit in increase of power consumption realized by changing the state of operation of step-up/down converter 15 and inverters 20 and 30 in accordance with the embodiment of the present invention. Therefore, even when the total power consumption is increased to the upper limit, it is still possible that the power input to the power storage device (battery B for running) exceeds the tolerable range, as shown in FIG. 7. In such a case, it becomes necessary to reduce the amount of power generation or to stop power generation by motor generator MG1, in order to avoid excessive charging of the power storage device.

Figure 8:
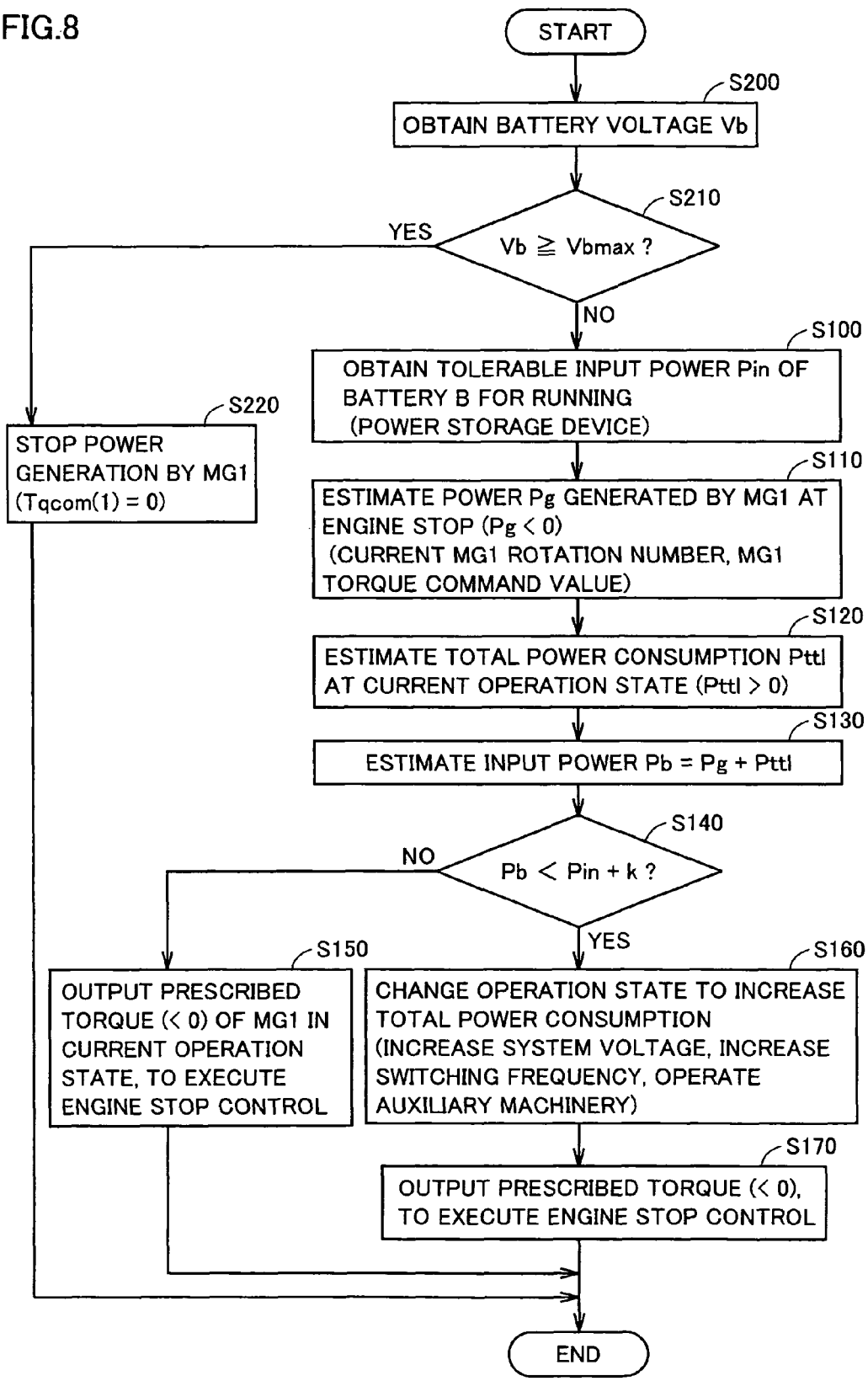
FIG. 8 is a flowchart representing a series of control processes in the engine stop control in Modification 1 of the embodiment of the present invention.

FIG. 8 is a flowchart representing a series of control processes in the engine stop control in Modification 1 of the embodiment of the present invention, to deal with this situation.

Referring to FIG. 8, in engine stop control in accordance with Modification 1 of the embodiment, steps S200 to S220 are executed in addition to the process shown in the flowchart of FIG. 3.

At step S200, controller 50 obtains the voltage of battery B for running (power storage device), that is, the battery voltage Vb, based on an output from voltage sensor 10. Further, at step S210, controller 50 compares the obtained battery voltage Vb with a management upper limit voltage Vbmax. The management upper limit voltage Vbmax is preferably set to have a margin with respect to a limit voltage that leads to a damage or decreased life of the battery B for running (power storage device).

If the determination at step S210 is NO, that is, if the battery voltage Vb has not reached the management upper limit voltage Vbmax, controller 50 executes the engine stop control to prevent excessive charging of battery B for running (power storage device) through the same process steps S100 to S170 as FIG. 3.

If the determination at step S210 is YES, that is, if the battery voltage Vb has reached the management upper limit voltage Vbmax or higher because of excessive charging of the power storage device, controller 50 stops power generation by motor generator MG1 at step S220. Specifically, it prohibits generation of torque by motor generator MG1 (sets Tqcom=0), and the execution of engine stop control is stopped.

By such a control structure, continuous excessive charging of battery B for running (power storage device) can reliably be avoided, and the device can be protected. In the flowchart of FIG. 7, step S210 corresponds to the "voltage determining means" of the present invention, and step S220 corresponds to the "power generation stopping means" of the present invention.

(Modification 2)

Figure 9:
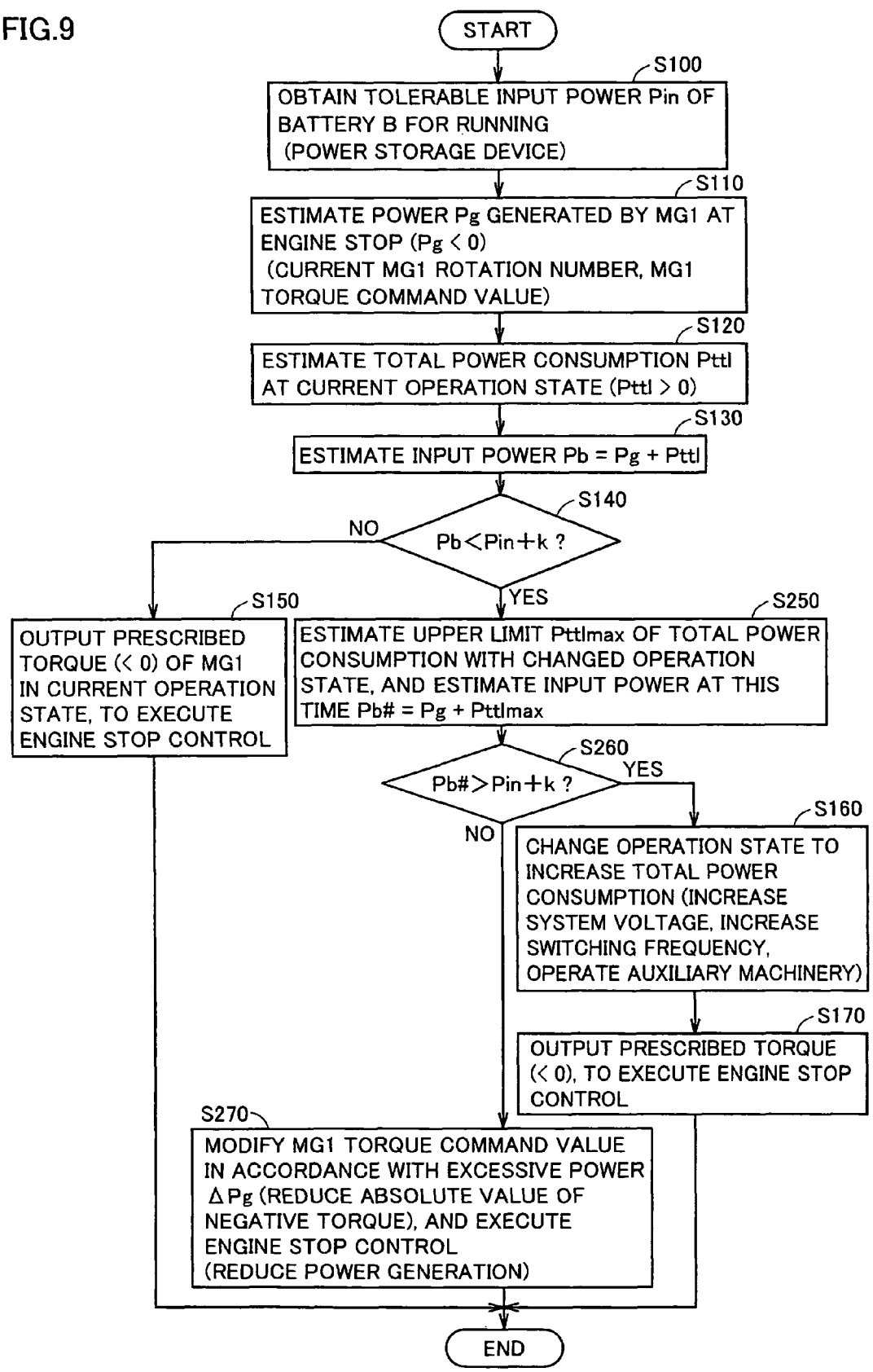
FIG. 9 is a flowchart representing a series of control processes in the engine stop control in Modification 2 of the embodiment of the present invention.

FIG. 9 is a flowchart representing a series of control processes in the engine stop control in Modification 2 of the embodiment of the present invention.

Referring to FIG. 9, in the engine stop control in accordance with Modification 2 of the embodiment shown in FIG. 7, steps S250 to S270 are executed in addition to the process of the flowchart shown in FIG. 7.

If the determination at step S140 is YES, that is, if the estimated input power Pb reflecting the total power consumption Ptt1 at the current state of operation exceeds the tolerable range, controller 50 estimates an upper limit of total power consumption Ptt1max that can be attained by changing the state of operation at step S250 and, calculates the estimated input power Pb# to the power storage device (battery B for running) at this time.

Further, at step S260, controller 50 determines whether or not the estimated input power Pb# of step S250 exceeds the tolerable range. Specifically, at step S260, whether Pb#>Pin+k holds or not is determined.

If the determination at step S260 is YES, that is, if the estimated input power Pb# is within the tolerable range (|Pb#|≦|Pin|+k), controller 50 executes steps S160 and S170, so that the state of operation is changed to increase the total power consumption to Ptt1# in accordance with the necessary amount of increase ΔPtt1 (FIG. 6), and executes the engine stop control to attain the desired deceleration by causing motor generator MG1 to output a prescribed negative torque.

If the determination at step S260 is NO, that is, if the estimated input power Pb# exceeds the tolerable range (|Pb#|>|Pin|+k), controller 50 decreases the absolute value of torque (negative torque) generated by motor generator MG1 so that the generated power (absolute value) by motor generator MG1 decreases in correspondence with the excessive generated power ΔPg=|Pb#|−|Pin|+k, at step S270. In other words, the absolute value of torque command value Tqcom (1), which is a negative value, is reduced. The amount of decrease of torque command value (absolute value) here can be set based on the excessive generated power ΔPg and the number of rotations of MG1.

By such a control structure, engine stop control can be realized in which deceleration when the engine is stopped is increased within a limited range that can reliably avoid continuous excessive charging of battery B for running (power storage device) and can protect the device. In the flowchart of FIG. 8, step S250 corresponds to the "input power predicting means" of the present invention, and step S270 corresponds to the "power generation reducing means" of the present invention.

In the present embodiment, a structure has been described as an example in which the electric power is exchanged between the generator (motor generator MG1) and the power storage device (battery B for running) used in the engine stop control, through step-up/down converter 15. Application of the present invention is not limited to such a structure. Specifically, even when arrangement of step-up/down converter 15 is omitted, the present invention is applicable, with the power consumption increased by changing the state of operation (increase in switching frequency) of inverters 20 and 30.

Further, though the engine stop control in a hybrid vehicle has been described as an example of the embodiment, the present invention is applicable to any vehicle having an engine 110 (internal combustion engine) and a motor generator that can execute the engine stop control involving power generating operation, without any other structural limitation.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A stop controller for an internal combustion engine in a vehicle including the internal combustion engine operated on fuel combustion, a first rotating electric machine formed to generate stopping force for said internal combustion engine by a power generating operation when said internal combustion engine is stopped, a second rotating electric machine capable of generating vehicle driving force in parallel with said internal combustion engine, and a power exchange circuit for exchanging power between a power storage device and said first and second rotating electric machines, wherein
  said power exchange circuit includes
    a converter provided between said power storage device and a DC power line, for exchanging DC power between said power storage device and said DC power line by a switching operation of a switching element such that the voltage on said DC power line matches a voltage command value,
    a first inverter formed to perform power-conversion between DC power on said DC power line and AC power input to/output from said first rotating electric machine, by switching operations of a plurality of switching elements, and
    a second inverter formed to perform power-conversion between DC power on said DC power line and AC power input to/output from said second rotating electric machine, by switching operations of a plurality of switching elements;

said stop controller comprising:
input limit setting means for setting tolerable input power of said power storage device;
power generation estimating means for estimating power generation when said first rotating electric machine generates prescribed said stopping force while said internal combustion engine is stopped;
input power estimating means for estimating total power consumption based on a sum of estimated power consumption by said power exchange circuit and said first and second rotating electric machines in the current operation state, when said internal combustion engine is stopped, and based on the estimated total power consumption and the power generation estimated by said power generation estimating means, for estimating input power to said power storage device;
first stop control means for generating an output torque command for said first rotating electric machine such that said first rotating electric machine generates said prescribed stopping force in said current operation state, when the input power estimated by said input power estimating means is within said tolerable input power;
loss control means for controlling an operation state of said power exchange circuit such that power consumption by said power exchange circuit increases, when the input power estimated by said input power estimating means exceeds said tolerable input power;
input power predicting means for predicting input power to said power storage device when the power consumption by said power exchange circuit is increased to an upper limit by said loss control means, if the input power estimated by said input power estimating means exceeds said tolerable input power;
power generation reducing means for modifying, when the input power estimated by said input power estimating means exceeds said tolerable input power and the input power predicted by said input power predicting means exceeds said tolerable input power, the output torque command for said first rotating electric machine from a value of said first stop control means, so that power generation by said first rotating electric machine is reduced; and
second stop control means for generating said output torque command comparable to said first stop control means, together with control of said operation state by said loss control means, when the input power estimated by said input power estimating means exceeds said tolerable input power and the input power predicted by said input power predicting means is within said tolerable input power.

2. The stop controller for an internal combustion engine according to claim 1, further comprising:
voltage determining means for comparing an output voltage of said power storage device with a management upper limit voltage; and
power generation stopping means for stopping, when it is determined by said voltage determining means that the output voltage of said power storage device exceeds said management upper limit voltage, the power generation operation by said first rotating electric machine when said internal combustion engine is stopped.

3. The stop controller for an internal combustion engine according to claim 1, wherein
said vehicle further includes a second rotating electric machine capable of generating vehicle driving force in parallel with said internal combustion engine;
said power exchange circuit includes
a converter provided between said power storage device and a DC power line, for exchanging DC power between said power storage device and said DC power line by a switching operation of a switching element,
a first inverter formed to perform power-conversion between DC power on said DC power line and AC power input to/output from said first rotating electric machine, by switching operations of a plurality of switching elements, and
a second inverter formed to perform power-conversion between DC power on said DC power line and AC power input to/output from said second rotating electric machine, by switching operations of a plurality of switching elements;
said switching operation in said converter is controlled such that voltage of said DC power line matches a voltage command value; and
said loss control means executes, when the input power estimated by said input power estimating means exceeds said tolerable input power, at least one of (1) increase of switching frequency of said switching element of said converter, (2) increase of switching frequency of each of said switching elements of said first inverter, (3) increase of switching frequency of each of said switching elements of said second inverter, and (4) increase of the voltage command value of said converter.

4. The stop controller for an internal combustion engine according to claim 1, wherein
said power storage device is implemented by a lithium ion secondary battery.

5. The stop controller for an internal combustion engine according to claim 1, wherein
said input power estimating means estimates said total power consumption, using at least a first map for estimating power loss at said first rotating electric machine using torque and rotation number of said first rotating electric machine as arguments, a second map for estimating power loss and effective power at said second rotating electric machine using torque and rotation number of said second rotating electric machine as arguments, a third map for estimating power loss at said first inverter based on the torque and rotation number of said first rotating electric machine, the voltage on said DC power line and switching frequency of said first inverter, a fourth map for estimating power loss at said second inverter based on the torque and rotation number of said second rotating electric machine, the voltage on said DC power line and switching frequency of said second inverter, and a fifth map for estimating, power loss at said converter based on the voltage of said DC power line, switching frequency of said converter and current of said power storage device.

6. The stop controller for an internal combustion engine according to claim 5, wherein
said input power estimating means estimates said total power consumption further using a sixth map for estimating a change in stored power of a smoothing capacitor connected to said DC power line, based on the voltage on said DC power line.

7. The stop controller for an internal combustion engine according to claim 5, wherein
said input power estimating means estimates said total power consumption further using a seventh map for estimating power consumption by a load, based on a state of operation of the load receiving power supply from said DC power line.

8. The stop controller for an internal combustion engine according to claim 7, wherein
said loss control means further changes the state of operation of said load so that power consumption by said load increases, when the input power estimated by said input power estimating means exceeds said tolerable input power.

9. The stop controller for an internal combustion engine according to claim 1, wherein
said power generation reducing means sets an amount of modifying said output torque command, based on an excess of predicted input power predicted by said input power predicting means with respect to said tolerable input power.

10. A stop control method for an internal combustion engine in a vehicle including the internal combustion engine operated on fuel combustion, a first rotating electric machine formed to generate force for stopping said internal combustion engine by a power generating operation when said internal combustion engine is stopped, a second rotating electric machine capable of generating vehicle driving force in parallel with said internal combustion engine, and a power exchange circuit for exchanging power between a power storage device and said first and second rotating electric machines, wherein
said power exchange circuit includes
a converter provided between said power storage device and a DC power line, for exchanging DC power between said power storage device and said DC power line by a switching operation of a switching element, such that the voltage on said DC power line matches a voltage command value,
a first inverter formed to perform power-conversion between DC power on said DC power line and AC power input to/output from said first rotating electric machine, by switching operations of a plurality of switching elements, and
a second inverter formed to perform power-conversion between DC power on said DC power line and AC power input to/output from said second rotating electric machine, by switching operations of a plurality of switching elements;
said stop control method comprising the steps of:
setting tolerable input power of said power storage device;
estimating power generation when said first rotating electric machine generates prescribed said stopping force while said internal combustion engine is stopped;
estimating total power consumption based on a sum of estimated power consumption by said power exchange circuit and said first and second rotating electric machines in the current operation state, when said internal combustion engine is stopped, and based on the estimated total power consumption and the estimated power generation, for estimating input power to said power storage device;
generating an output torque command for said first rotating electric machine such that said first rotating electric machine generates said prescribed stopping force in said current operation state, when the input power estimated at said step of estimating is within said tolerable input power;
controlling an operation state of said power exchange circuit such that power consumption by said power exchange circuit increases, when the estimated input power exceeds said tolerable input power;
predicting input power to said power storage device when the power consumption by said power exchange circuit is increased to an upper limit at said step of controlling, if the estimated input power exceeds said tolerable input power;
modifying, when the input power estimated at said step of estimating exceeds said tolerable input power and the input power predicted at said step of predicting exceeds said tolerable input power, the output torque command for said first rotating electric machine from a value at said step of generating, so that power generation by said first rotating electric machine is reduced; and
generating said output torque command comparable to that of said step of generating, together with control of said operation state at said step of controlling, when the input power estimated at said step of estimating exceeds said tolerable input power and the input power predicted at said step of predicting is within said tolerable input power.

11. The stop control method for an internal combustion engine according to claim 10, further comprising the steps of:
comparing an output voltage of said power storage device with a management upper limit voltage; and
stopping, when it is determined at said step of comparing that the output voltage of said power storage device exceeds said management upper limit voltage, the power generation operation by said first rotating electric machine when said internal combustion engine is stopped.

12. The stop control method for an internal combustion engine according to claim 10, wherein
said vehicle further includes a second rotating electric machine capable of generating vehicle driving force in parallel with said internal combustion engine;
said power exchange circuit includes
a converter provided between said power storage device and a DC power line, for exchanging DC power between said power storage device and said DC power line by a switching operation of a switching element,
a first inverter formed to perform power-conversion between DC power on said DC power line and AC power input to/output from said first rotating electric machine, by switching operations of a plurality of switching elements, and
a second inverter formed to perform power-conversion between DC power on said DC power line and AC power input to/output from said second rotating electric machine, by switching operations of a plurality of switching elements;
said switching operation in said converter is controlled such that voltage of said DC power line matches a voltage command value; and
at said step of controlling, when the estimated input power exceeds said tolerable input power, at least one of (1) increase of switching frequency of said switching element of said converter, (2) increase of switching frequency of each of said switching elements of said first inverter, (3) increase of switching frequency of each of said switching elements of said second inverter, and (4) increase of the voltage command value of said converter, is executed.

13. The stop control method for an internal combustion engine according to claim 10, wherein
said power storage device is implemented by a lithium ion secondary battery.

14. The stop control method for an internal combustion engine according to claim 10, wherein
at said step of estimating said input power, said total power consumption is estimated by using at least a first map for estimating power loss at said first rotating electric machine using torque and rotation number of said first rotating electric machine as arguments, a second map for estimating power loss and effective power at said second rotating electric machine using torque and rotation number of said second rotating electric machine as arguments, a third map for estimating power loss at said first inverter based on the torque and rotation number of said first rotating electric machine, the voltage on said DC power line and switching frequency of said first inverter, a fourth map for estimating power loss at said second inverter based on the torque and rotation number of said second rotating electric machine, the voltage on said DC power line and switching frequency of said second inverter, and a fifth map for estimating power loss at said converter based on the voltage of said DC power line, switching frequency of said converter and current of said power storage device.

15. The stop control method for an internal combustion engine according to claim 14, wherein at said step of estimating said input power, said total power consumption is estimated further using a sixth map for estimating a change in stored power of a smoothing capacitor connected to said DC power line, based on the voltage on said DC power line.

16. The stop control method for an internal combustion engine according to claim 14, wherein at said step of estimating said input power, said total power consumption is estimated further using a seventh map for estimating power consumption by a load, based on a state of operation of the load receiving power supply from said DC power line.

17. The stop control method for an internal combustion engine according to claim 16, wherein at said step of control, the state of operation of said load is changed so that power consumption by said load increases, when the input power estimated at said step of estimating input power exceeds said tolerable input power.

18. The stop control method for an internal combustion engine according to claim 10, wherein at said step, an amount of modifying said output torque command is set, based on an excess of predicted input power predicted at said step of predicting with respect to said tolerable input power.

* * * * *